Nov. 17, 1970 J. A. GREEFKES 3,541,265

RECEIVER FOR A TIME MULTIPLEXING TRANSMISSION SYSTEM

Filed March 1, 1968 3 Sheets-Sheet 1

INVENTOR
JOHANNES A. GREEFKES

BY Frank R. Trifari
AGENT

Nov. 17, 1970 J. A. GREEFKES 3,541,265

RECEIVER FOR A TIME MULTIPLEXING TRANSMISSION SYSTEM

Filed March 1, 1968 3 Sheets-Sheet 2

INVENTOR
JOHANNES A. GREEFKES

BY [signature]
AGENT

Nov. 17, 1970 J. A. GREEFKES 3,541,265

RECEIVER FOR A TIME MULTIPLEXING TRANSMISSION SYSTEM

Filed March 1, 1968 3 Sheets-Sheet 3

INVENTOR
JOHANNES A. GREEFKES

BY Frank R. Jinfani
AGENT 3,541,265

RECEIVER FOR A TIME MULTIPLEXING TRANSMISSION SYSTEM

Johannes Anton Greefkes, Emmasingel, Eindhoven, Netherlands, assignor, by mesne assignments, to U.S. Philips Corporation, New York, N.Y., a corporation of Delaware Filed Mar. 1, 1968, Ser. No. 709,568
Claims priority, application Netherlands, Jan. 10, 1968, 6704096
Int. Cl. H03k *19/40*
U.S. Cl. 179—15 3 Claims

ABSTRACT OF THE DISCLOSURE

A system for distributing the pulses of a time multiplexed pulse signal to separate channels is comprised of a pair of shift registers. The pulses of the pulse signal are stepped into the registers during opposite halves of a pulse cycle. The outputs of each of the registers are gated to the separate channels by means of a gating pulse which occurs during the time signals are being stepped into the other shift register.

The invention relates to a time multiplexing transmission system for regenerating and distributing in a cyclic sequence series of signal pulses which series are each preceded by a synchronisation pulse, comprising a cyclic pulse distributor controlled by a synchronisation pulse selector, the signal pulses separated in the distributor being applied in each receiving channel to a gate circuit which is also connected to an output of a synchronisation pulse distributor connected to a synchronisation pulse regenerator.

Such a receiver is known from U.S. Pat. No. 2,744,960. In the receiver described in this patent specification, the synchronisation pulse distributor is constituted by a delay line having a number of taps equal to the number of receiving channels, the cyclic pulse distributor being constituted by the same type of delay line to which the synchronisation pulses are applied, as well as a gate circuit per receiving channel having a pulse widener connected to said gate circuit.

The object of the invention is a new conception of the receiver mentioned in the preamble to save apparatus.

The receiver according to the invention is characterized in that the cyclic pulse distributor is constituted by two shift registers and by a cyclic pulse group distributor for the group-wise distribution of the received signal pulses between the inputs of the two shift registers, the gate circuits of the receiving channels connected to the same shift register being connected in common to the same output of the synchronisation pulse distributor.

In this receiver it is sufficient to use a very simple synchronisation pulse distributor having only two outputs instead of a long delay line, while in addition per receiving channel a gate circuit and a pulse widener connected thereto are saved.

In order that the invention may be readily carried into effect, it will now be described in greater detail, by way of example, with reference to the accompanying drawings, in which.

Figure 3:
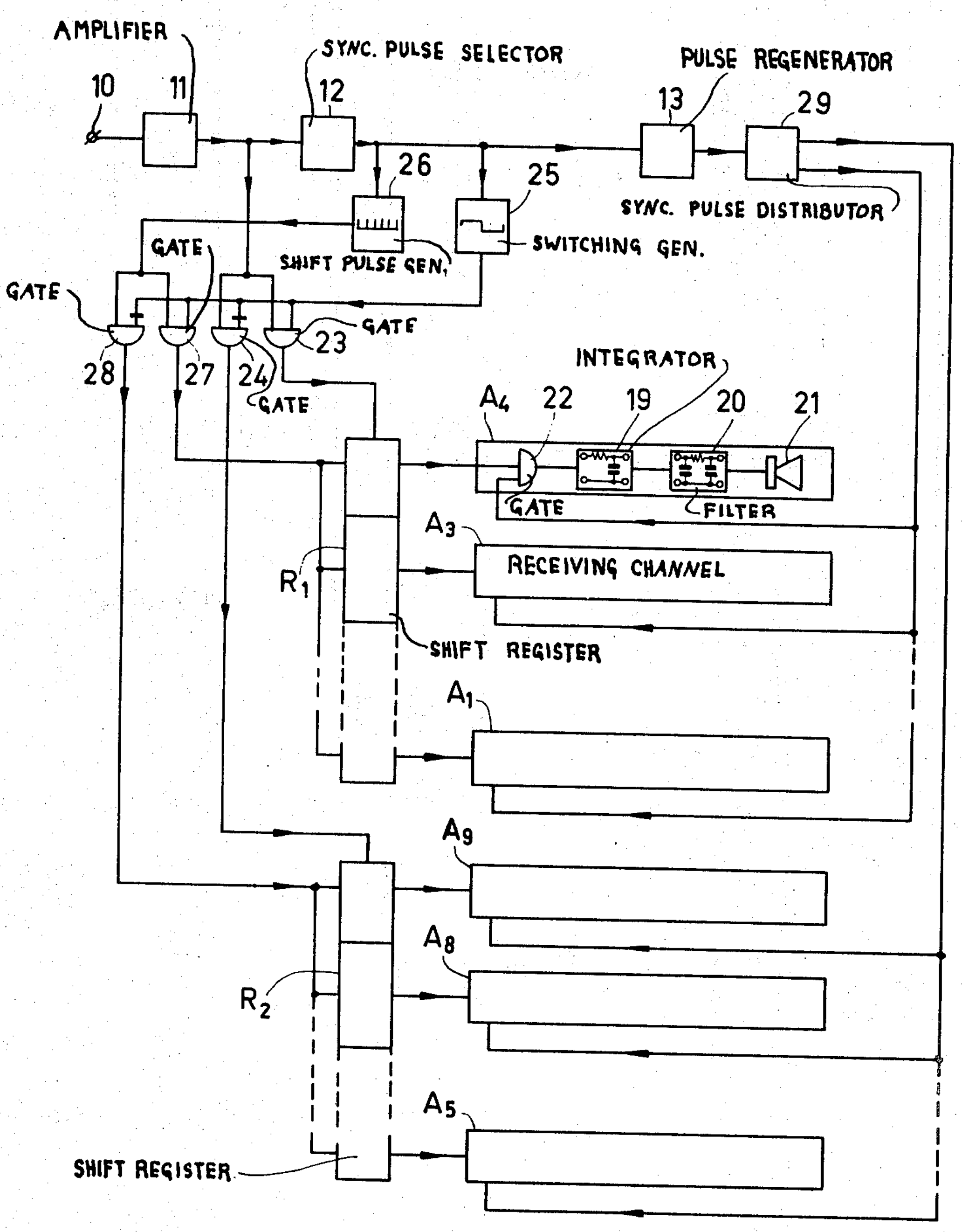
FIG. 3 shows an example of a receiver according to the invention.

FIGS. 4*a–h* show a few time diagrams to explain the operation of the receiver shown in FIG. 3.

Figure 1:
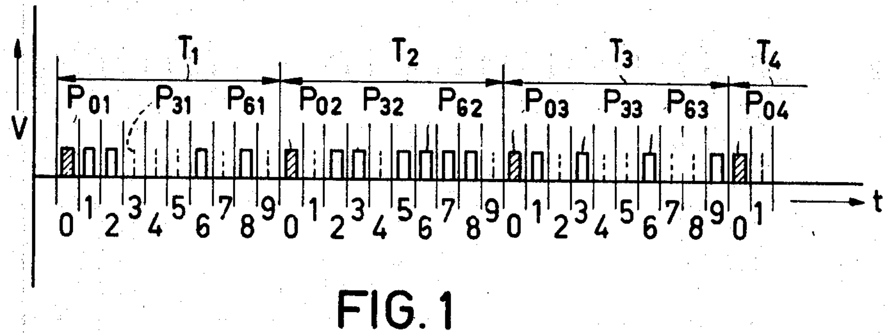
FIG. 1 shows a time diagram of a time multiplexing transmitter having 9 information and 1 synchronisation channels.

FIG. 1 shows a few signal periods of a time multiplexing transmitter employing 9+1 channels for the signal transmission by delta-modulation. $T_1$, $T_2$, $T_3$ and $T_4$ denote successive signal periods, which are each divided into 10 equal intervals. The first interval denoted by 0 serves for the transmission of the synchronisation pulses $P_{01}$, $P_{02}$, and so on, shown in shaded areas. The remaining intervals are consecutively numbered from 1 to 9 and are destined for transmitting pulses associated with 9 different channels. In FIG. 1 three pulses associated with the third channel are denoted by $P_{31}$, $P_{32}$ and $P_{33}$ it being noted that the pulse $P_{31}$ is suppressed as is denoted by the broken line. Similarly, three pulses associated with the sixth channel are denoted by $P_{61}$, $P_{62}$ and $P_{63}$, it being noted that said pulses are all present.

The pulses associated with a given channel are present and absent in alternation which depends upon the signal to be transmitted. The synchronisation pulses are continuously present, that is to say, that the interval denoted by 0 of each signal period comprises a synchronisation pulse.

Figure 4:
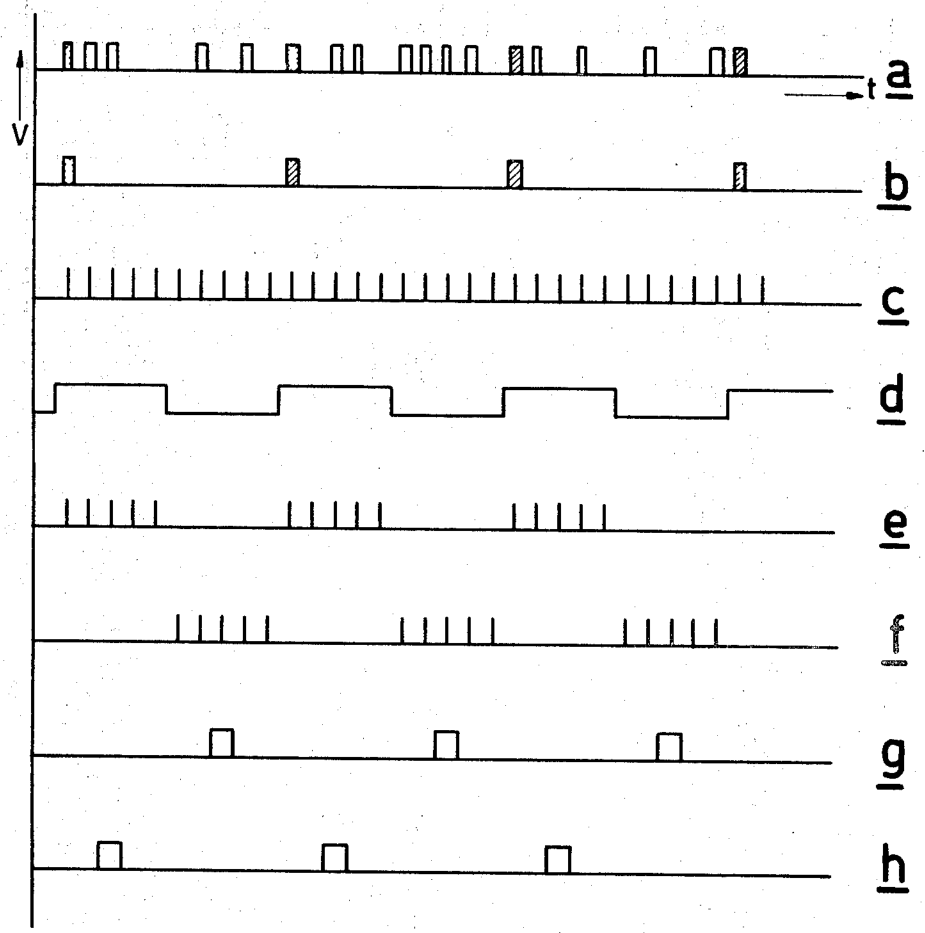
Figure 2:
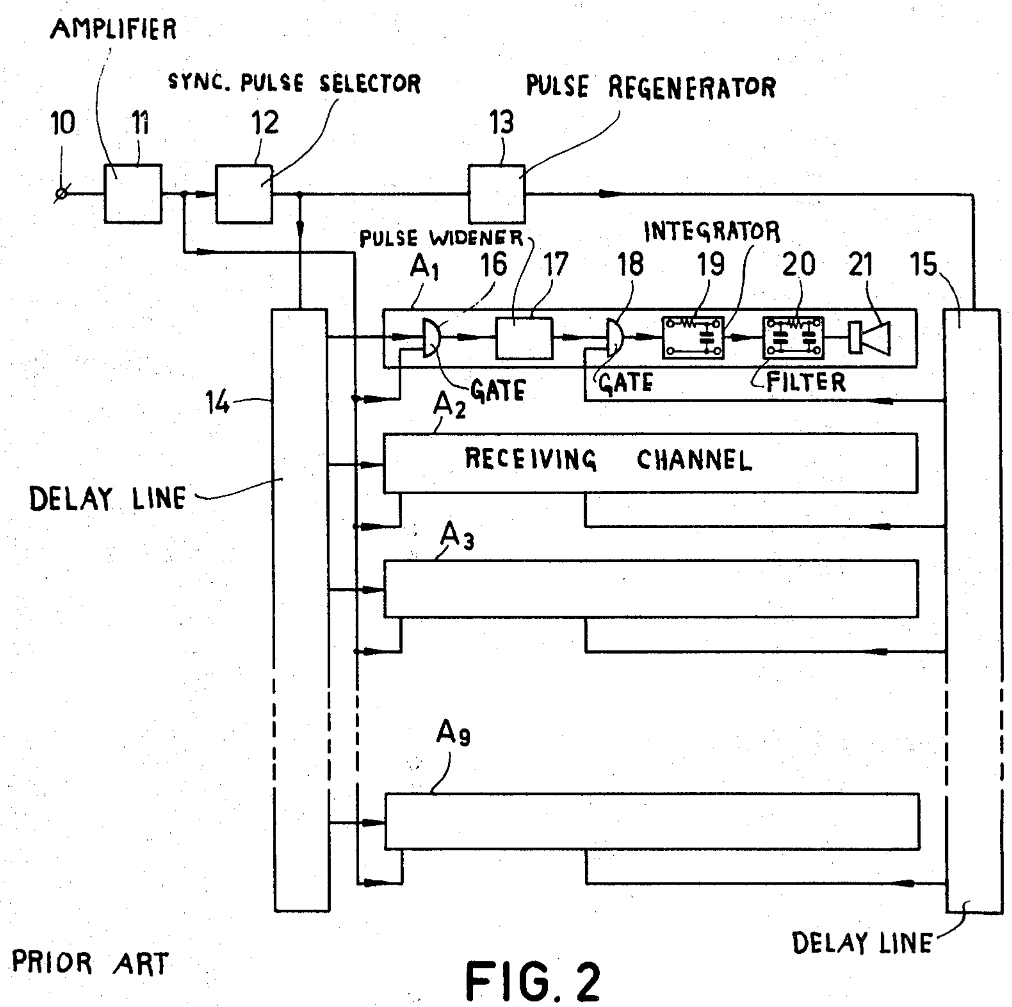
FIG. 2 shows a known receiver.

In the receiver shown in FIG. 2 the pulses received at the input 10 are applied to an amplifier device 11 which, for example, comprises successively a high-frequency amplifier, a mixer stage, an intermediate frequency simplifier, an amplitude detector, an amplitude limiting, and a threshold circuit. The pulses derived from the amplifier device 11 have the character shown in FIG. 4*a*. All these pulses have the same amplitude but show deviations from their normal time position, while the duration of all the pulses is not the same either. The synchronisation pulses and signal pulses derived from the amplifier device 11 are supplied to a synchronisation pulse selector 12. The synchronisation pulses, which are shaded in the drawing, are derived from the output of said selector and are shown individually in FIG. 4*b*. The complete details of the selector 12 are shown in FIG. 4 of said patent.

The synchronisation pulses appearing in the output circuit of the selector 12, are not equidistant as a result of interferences. To suppress the interference or noise of the synchronisation pulses, the synchronisation pulses are applied to a synchronisation pulse regenerator 13. The details of the regenerator 13 are shown in FIG. 5 of said patent. The synchronisation pulses appearing in the output circuit of the selector 12 are further applied to the input of a first delay line 14, while the synchronisation pulses, the noise of which is suppressed are applied to the input of a second delay line 15. A first gate circuit of each of the receiving channels $A_1$ to $A_9$ is connected to a separate tap of the delay line 14. This gate circuit is shown in the receiving channel $A_1$ by 16. The remaining receiving channels are each identical to the receiving channel $A_1$ and are therefore not shown in detail. The first gate circuits of all the receiving channels are furthermore connected to the output of the amplifier device 11 and therefore receive all the signal pulses. The first gate circuit of each receiving channel supplies an output pulse when a signal pulse coincides with a pulse derived from the delay line 14. By suitable choice of the tapping on the delay line 14 it is achieved that in each receiving channel coincidence occurs only with the signal pulses destined for the relative receiving channel. Therefore, only signal pulses occur in the output circuit of the gate circuit 16 which are associated with the relative receiving channel. The output pulses of the gate circuit 16 are applied to a pulse widener 17 the output pulses of which are applied to a second gate circuit 18. The complete details of the pulse widener 17 are shown in FIG. 6 of said patent. The second gate of each receiving channel is also connected to a suitable tapping of the delay line 15. Each second gate circuit supplies an output pulse when the pulse derived from the delay line 15 coincides with the output pulse of the pulse widener 17. The signal pulses from which the noise is suppressed and which are derived from the output of the gate circuit 18 are applied, through successively an integrator 19 and a low-pass filter 20, to a loudspeaker 21. In this receiver large phase differences between the synchronisation pulses of which the noise is suppressed and the synchronisation pulses derived from synchronisation pulse selectors 12 may be permitted. By the use of the pulse widener 17 the interval in which the pulse derived from the delay line 15 can coincide with a signal pulse is acutally increased considerably.

A saving of apparatus is obtained with the receiver shown in FIG. 3. In the receiver shown in FIG. 3, a gate circuit of each receiving channel $A_1$ up to and including $A_4$ is connected to a separate output of a shift register $R_1$ and a gate circuit of each receiving channel $A_5$ up to and including $A_9$ is connected to a separate output of a shift register $R_2$. This gate circuit is denoted by 22 in the receiving channel $A_4$. The remaining receiving channels are identical to receiving channel $A_4$. The signal pulses occurring in the output circuit of the amplifier device 11, are applied to two gate circuits 23 and 24. These gate circuits are furthermore connected to a switching generator 25 which is synchronised by the synchronisation pulses appearing in the output circuit of the selector 12. The output signal of the switching generator 25 has the character shown in FIG. 4*d*. The duration of a period of the switching generator 25 is the same as that of a signal period. Each period is divided into two equal intervals. In one interval the output signal has a high level and in the other interval it has a low level. The gate circuit 23 supplies an output signal for each signal pulse which coincides with a switching signal of high level and the gate circuit 24 supplies an output pulse for each signal pulse which coincides with a switching signal of low level. The pulses appearing in the output circuit of the gate circuit 23 are applied to register $R_1$ and the pulses appearing in the output circuit of the gate circuit 24 are applied to register $R_2$. By suitable choice of the phase of the switching signal it is achieved that the pulses associated with the signal interval 0 to 4 inclusive, are applied to register $R_1$ and the pulses associated with the signal intervals 5 to 9 inclusive are applied to register $R_2$.

The shift registers $R_1$ and $R_2$ are controlled by shift pulses which are derived from a shift pulse generator 26. This generator supplies a shift pulse in every signal interval. The shift pulses have the character shown in FIG. 4*c*. The shift pulse generator is synchronized by the synchronisation pulses. By suitable choice of the phase of the shift pulses it is achieved that every signal pulse coincides with a shift pulse. The shift pulses are applied to two gate circuits 27 and 28 which are also connected to the switching generator 25. The gate circuit 27 supplies an output pulse for each shift pulse which coincides with a switching signal of high level and the gate circuit 28 supplies an output pulse for each shift pulse which coincides with a switching signal of low level. The shift pulses appearing in the output circuit of the gate circuit 27 are applied to register $R_1$, and the shift pulses appearing in the output circuit of the gate circuit 28 are applied to the register $R_2$. With the above denoted choice of the phase of the switching signal it is therefore achieved that in each of the signal intervals 0 to 4 inclusive a shift pulse is applied to a shift register $R_1$ and in each of the signal intervals 5 to 9 inclusive a shift pulse is applied to shift register $R_2$. The shift pulses applied to the shift register $R_1$ are shown individually in FIG. 4*e*, and the shift pulses applied to shift register $R_2$ are shown individually in FIG. 4*f*. Every shift pulse supplied to a shift register shifts the pulses recorded in the register over one position and simultaneously shifts the signal pulse applied to the register in the first register place. By suitable choice of the output of the register it is achieved that the signal pulse associated with a given receiving channel is indicated at the relative output at the instant the switching generator switches. The shift registers are constructed from bistable elements which continue to indicate the presence or absence of a signal pulse between two successive shift pulses. Therefore, at the outputs of shift register $R_1$ the signal pulses associated with the receiving channels $A_1$ to $A_4$ inclusive are indicated during the signal intervals 5 to 9 inclusive. Similarly, at the outputs of shift register $R_2$ the signal pulses associated with the receiving channels $A_5$ to $A_9$ inclusive, are indicated during the signal intervals 0 to 4 inclusive. The gate circuits 22 of the receiving channels $A_1$ to $A_4$ inclusive are also connected to a first output of the synchronisation pulse distributor 29 and the gate circuits 22 of the receiving channels $A_5$ to $A_9$ inclusive are also connected to a second output of the synchronisation pulse distributor. which is controlled by the synchronisation pulses and the noise of which is suppressed applies a pulse to the first output in the second half of each signal period comprising the signal intervals 5 to 9 inclusive and applies a pulse to the second output in the first half of each signal period comprising the signal intervals 0 to 4 inclusive. The pulses appearing at the first output show the character shown in FIG. 4*g* and the pulses appearing at the second output have the character shown in FIG. 4*h*. The gate circuit 22 supplies an output pulse when a pulse derived from the synchronisation pulse distributor 29 coincides with a signal pulse derived from the relative output of the relative register. As a result of the above described choice of the output of the synchronisation pulse distributor 29 it is achieved that coincidence can occur only in the receiving channels, the signal pulses of which are indicated at the relative outputs of the relative register. The signal pulses the noise of which is suppressed and which appear in the output circuit of gate circuit 22 are applied to loudspeaker 21 in the same manner as in FIG. 2 through successively the integrator 19 and the low-pass filter 20.

As a result of the fact that the signal pulse associated with a receiving channel is indicated at the relative output of the relative shift register for half a signal period, a considerable phase shift may be permitted between the synchronisation pulses, the noise of which is suppressed and the synchronisation pulses the noise of which is not suppressed. The advantageous property of the receiver shown in FIG. 2 is therefore maintained while a considerable saving of apparatus is obtained. A comparison with FIG. 2, for example, shows that per receiving channel a gate circuit and a pulse widener are saved, while in addition the delay line 15 is saved.

Effecting a direct connection between an incoming time multiplexing channel and an outgoing time multiplexing channel in the telephone circuit is normally possible only if there is coincidence in time between the two channels. In the absence of coincidence the incoming channel may first be demodulated and then be modulated on the outgoing channel. The presence in parallel form of the channels $A_1$ to $A_4$ and $A_5$ to $A_9$, respectively, in alternate half signal periods enables a direct connection of the incoming channels out of a given half signal period to outgoing channels associated with the same half signal period without the incoming channels having first to be demodulated.

What is claimed is:

1. A receiver for a time multiplexing transmission system for regenerating and distributing in cyclic sequence series of signal pulses which series are each preceded by a synchronisation pulse, comprising a cyclic pulse distributor controlled by a synchronisation pulse selector, the signal pulses separated in the distributor being applied in each receiving channel to a gate circuit which is also connected to an output of a synchronisation pulse distributor which is connected to a synchronisation pulse regenerator, characterized in that the cyclic pulse distributor is constituted by two shift registers and by a cyclic pulse group distributor for the groupwise distribution of the received signal pulses between the inputs of the two shift registers, the gate circuits of the receiving channels connected to the same shift register being connected in common to the same output of he synchronisation pulse distributor.

2. A pulse distributing system for time multiplexed pulses of the type in which pulses corresponding to a plurality of signals occur during signal intervals in cyclic sequence during pulse cycles, each cycle thereof including a synchronizing pulse, said system comprising a source of said time multiplexed pulses, a plurality of signal channels, first and second shift registers, gate means for connecting the outputs of said registers to the inputs of separate signal channels, means connected to apply said time multiplexed signals to said first and second registers during opposite half cycles of said pulse cycles, means for shifting said first and second registers at the rate of occurrence of said signal intervals only during the time multiplexed signals are applied to the respective registers, and means for closing said gate means during the time said time multiplexed signals are applied to the corresponding register.

3. The pulse distributing system of claim 2 comprising means connected to said source for separating said synchronizing pulses from said time multiplexed pulses, said means for closing said gate means comprising means connected to said pulse separating means for producing first and second pulses that occur only during opposite halves of said pulse cycles, and means applying said first and second pulses to the gate means corresponds to said first and second register respectively, whereby said gate means corresponding to said first and second registers are opened only during the occurrence of said first and second pulses respectively.

References Cited

UNITED STATES PATENTS 3,359,371 12/1967 Edstrom .............. 179—15

RALPH D. BLAKESLEE, Primary Examiner

U.S. Cl. X.R.

178—50

PO-1050
(5/69)

UNITED STATES PATENT OFFICE
CERTIFICATE OF CORRECTION

Patent No. 3,541,265 Dated November 17, 1970

Inventor(s) JOHANNES ANTON GREEFKES

It is certified that error appears in the above-identified patent and that said Letters Patent are hereby corrected as shown below:

IN THE TITLE PAGE after "Netherlands" cancel "Jan. 10, 1968" and insert -- March 18, 1967 --;

Signed and sealed this 3rd day of December 1974.

(SEAL)
Attest:

McCOY M. GIBSON JR.
Attesting Officer

C. MARSHALL DANN
Commissioner of Patents